(12) United States Patent
Kong et al.

(10) Patent No.: US 10,293,733 B2
(45) Date of Patent: May 21, 2019

(54) CUP HOLDER AND METHOD OF MANUFACTURING THE SAME

(71) Applicants: Hyundai Motor Company, Seoul (KR); Kia Motors Corporation, Seoul (KR)

(72) Inventors: Byung Seok Kong, Gunpo-si (KR); Kwan Woo Lee, Suwon-si (KR); Sung Hwan Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 11 days.

(21) Appl. No.: 15/379,132

(22) Filed: Dec. 14, 2016

(65) Prior Publication Data
US 2018/0001811 A1 Jan. 4, 2018

(30) Foreign Application Priority Data

Jul. 4, 2016 (KR) .................. 10-2016-0084019

(51) Int. Cl.
*B60N 3/00* (2006.01)
*B60N 3/10* (2006.01)

(52) U.S. Cl.
CPC .................. *B60N 3/108* (2013.01)

(58) Field of Classification Search
CPC ...................................... B60N 3/108
USPC ........................................ 224/544
See application file for complete search history.

(56) References Cited

U.S. PATENT DOCUMENTS

| 5,054,733 A * | 10/1991 | Shields ............... | B60N 3/101 248/154 |
| 5,839,711 A | 11/1998 | Bieck et al. | |
| 6,860,457 B2 * | 3/2005 | Then .................. | B60N 3/101 224/926 |
| 7,487,945 B2 * | 2/2009 | Liu ..................... | B60N 3/106 224/926 |
| 7,748,679 B2 * | 7/2010 | Kikuchi .............. | B60N 3/101 224/926 |
| 7,789,265 B2 * | 9/2010 | Kearney .............. | B60N 3/106 220/737 |
| 7,866,620 B2 * | 1/2011 | Kaemmer ........... | B60N 3/106 224/282 |

(Continued)

FOREIGN PATENT DOCUMENTS

| JP | 8-295169 A | 11/1996 |
| JP | 2003-341680 A | 12/2003 |

(Continued)

*Primary Examiner* — Peter N Helvey
(74) *Attorney, Agent, or Firm* — Morgan, Lewis & Bockius LLP (57) ABSTRACT

A cup holder may include a holder body having a holding groove opened at an upper portion thereof, and provided such that a container is inserted into the holding groove, a guide integrally or monolithically formed in the holder body with an elastic adjustment body interposed therebetween, so as to protrude inward from the holding groove, the guide tightly supporting a side of the container in a state in which the guide protrudes inward from the holding groove, and the elastic adjustment body integrally or monolithically formed in the guide and the holder body so as to provide an elastic restoring force in order for the guide to elastically protrude.

12 Claims, 6 Drawing Sheets

(56) References Cited

U.S. PATENT DOCUMENTS

| | | | |
|---|---|---|---|
| 8,360,379 B2* | 1/2013 | Porcelli | B60N 3/102 248/311.2 |
| 8,733,724 B2* | 5/2014 | Voigt | B60N 3/101 220/703 |
| 9,561,745 B2* | 2/2017 | Sawada | B60N 3/10 |
| 9,796,317 B2* | 10/2017 | Neumann | E05D 15/0604 |
| 9,834,122 B2* | 12/2017 | Vaupotic | F16B 2/20 |
| 2004/0021048 A1* | 2/2004 | Schaal | B60N 3/108 248/310 |
| 2004/0084461 A1* | 5/2004 | Eisenbraun | B60N 3/103 220/739 |
| 2004/0108428 A1* | 6/2004 | Leopold | B60N 3/102 248/311.2 |
| 2004/0262481 A1* | 12/2004 | Carnevali | B60N 3/103 248/311.2 |
| 2005/0082455 A1* | 4/2005 | Jones | B60N 3/107 248/311.2 |
| 2005/0184209 A1* | 8/2005 | Dobos | B60N 3/106 248/311.2 |
| 2005/0189806 A1* | 9/2005 | Hall | B60N 2/2851 297/256.11 |
| 2005/0199770 A1* | 9/2005 | Andrews | B60N 3/103 248/311.2 |
| 2010/0200720 A1* | 8/2010 | Kaemmer | B60N 3/106 248/311.2 |
| 2011/0127308 A1* | 6/2011 | Ogura | B60N 3/106 224/545 |
| 2015/0053834 A1* | 2/2015 | Virgen | B29C 45/0001 248/346.04 |
| 2015/0210211 A1 | 7/2015 | Bozio et al. | |

FOREIGN PATENT DOCUMENTS

| | | | |
|---|---|---|---|
| JP | 2009-214595 A | | 9/2009 |
| KR | 10-2005-0027550 A | | 3/2005 |
| KR | 10-2005-0046945 A | | 5/2005 |
| KR | 10-0600132 B1 | | 7/2006 |
| KR | 10-2010-0082097 A | | 7/2010 |
| KR | 10-0969054 B1 | | 7/2010 |

\* cited by examiner

CUP HOLDER AND METHOD OF MANUFACTURING THE SAME

CROSS-REFERENCE TO RELATED APPLICATION

The present application claims priority to Korean Patent Application No. 10-2016-0084019 filed on Jul. 4, 2016, the entire contents of which is incorporated herein for all purposes by this reference.

BACKGROUND

Field of the Invention

The present invention relates to a cup holder and a method of manufacturing the same. More particularly, it relates to a cup holder and a method of manufacturing the same, which are capable of reducing the number of parts and assembly processes and thus reducing costs while improving problems relating to noise and non-uniform operating force.

Description of Related Art

In general, vehicles are equipped therein with a variety of features for the convenience of drivers and passengers. Examples of the convenient features include a console box capable of storing various objects, an armrest on which a user can rest her/his arm, and a cup holder capable of holding beverage containers, such as cans, bottles, and cups.

Among them, the cup holder is typically installed on an instrument panel in front of a driver seat and a passenger seat, in a console box between the driver seat and the passenger seat, on a tray in front of the console box, or the like, in order for a driver or a passenger to put various beverage containers, such as cans, bottles, and cups.

In addition, such cup holders are installed at in-vehicle different positions, e.g. a door trim or armrest, the back of a front seat, and the back of a console box, so that passengers on a rear seat can use them.

A cup holder includes a holder body which has a holding groove opened at the upper portion thereof so that a container is inserted into and held in the holding groove, and a guide which is installed in the holder body and guides the container inserted into the holder body while tightly supporting the side of the held container.

In the cup holder, for example, the guide may be provided plurally and may be installed on the inner surface of the holding groove of the holder body. In this case, each of the guides may be installed on the holding groove of the holder body so as to elastically protrude or rotate therefrom.

The guide elastically protrudes or rotates inward from the holding groove and tightly supports the side of the container in the holding groove. In order to elastically operate the guide, an elastic member is installed between the guide and the holder body or between the guide and a guide housing which is integrally or monolithically formed with the holder body.

The elastic member may be a torsion spring in a coil spring form, and the elastic restoring force of the spring is a force that enables the guide to elastically protrude or rotate inward from the holding grove.

In addition, the elastic restoring force of the spring acts in the direction in which the guide is pressed against the side of the container, thereby providing the contact force and support force of the guide with respect to the container.

Meanwhile, the guide has a protrusion formed thereon, and the holder body (or the guide housing) has a slot formed therein such that the protrusion of the guide is inserted into the slot. Thus, the guide protrudes or rotates while the protrusion is guided by the slot.

However, since the conventional cup holder includes many parts, e.g. the holder body, the guide housing, the guide, and the spring, a large number of processes are required to assemble them. For these reasons, there is a problem in that production costs and manufacturing costs are increased.

In addition, when the guide is operated while the cup is being held, noises due to the spring and the friction between the slot and the protrusion may occur, and operating force may not be uniformly applied to the container depending on the shape thereof.

Meanwhile, U.S. Pat. No. 5,839,711 discloses a cup holder in which a common spring ring-type jaw is operated. In the cup holder, the jaw is elastically operated by the common spring ring.

In the spring ring type, the number of parts and assembly processes may be reduced, and thus cost may be reduced. In addition, noise may be reduced and operating force may be uniform since the elastic force of the spring ring is used.

However, since the process of assembling the jaw and the spring ring is required, there is a disadvantage in terms of the process.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cup holder and a method of manufacturing the same, which are capable of reducing the number of parts and assembly processes and thus reducing costs while improving problems relating to noise and non-uniform operating force.

In an exemplary embodiment, a cup holder includes a holder body having a holding groove opened at an upper portion thereof, and provided such that a container is inserted into the holding groove, a guide integrally or monolithically formed in the holder body with an elastic adjustment body interposed therebetween, so as to protrude inward from the holding groove, the guide tightly supporting a side of the container in a state in which the guide protrudes inward from the holding groove, and the elastic adjustment body integrally or monolithically formed in the guide and the holder body so as to provide an elastic restoring force in order for the guide to elastically protrude.

In another exemplary embodiment, a method of manufacturing a cup holder includes a first injection molding process of pouring molten resin into a cavity in a primary mold and integrally forming a holder body and a guide by injection molding, the holder body having a holding groove for holding a container, and a vertically elongated opening portion formed in a side thereof, in which the guide is installed, an upper end of the guide being integrally connected to the holder body; inserting a primary molded product, formed in the first injection molding process into a secondary mold; and a second injection molding process of pouring molten resin for forming an elastic adjustment body into a cavity in the secondary mold and forming an elastic adjustment body, integrally fixed to the holder body and the guide, by injection molding.

In a further exemplary embodiment, a method of manufacturing a cup holder includes individually forming a holder body and a guide by injection molding, the holder body having a holding groove for holding a container, and a vertically elongated opening portion formed in a side thereof, in which the guide is installed, inserting the formed holder body and guide into a secondary mold, and pouring molten resin for forming an elastic adjustment body into a cavity in the secondary mold, and forming an elastic adjustment body, integrally fixed to the holder body and the guide, by injection molding.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will be understood that when a component is referred to as being "comprising" any component, it does not exclude other components, but can further comprises the other components unless otherwise specified.

The present invention is to provide a cup holder and a method of manufacturing the same, which are capable of reducing the number of parts and assembly processes and thus reducing costs while improving problems relating to noise and non-uniform operating force.

In order to resolve the above-mentioned conventional problems while preventing a cup from slipping and providing high quality, the present invention is mainly characterized by a structure, in which a holder body having a holding groove for holding a container, a guide for tightly supporting the side of the container held in the holding groove, and an elastic adjustment body for the elastic operation of the guide are integrally or monolithically formed with one another, and a method of manufacturing the same.

The container held in the cup holder may be understood as including a variety of containers such as cans, bottles, and cups, and the present invention is not limited to the form, usage, and type of the held container.

Figure 1:
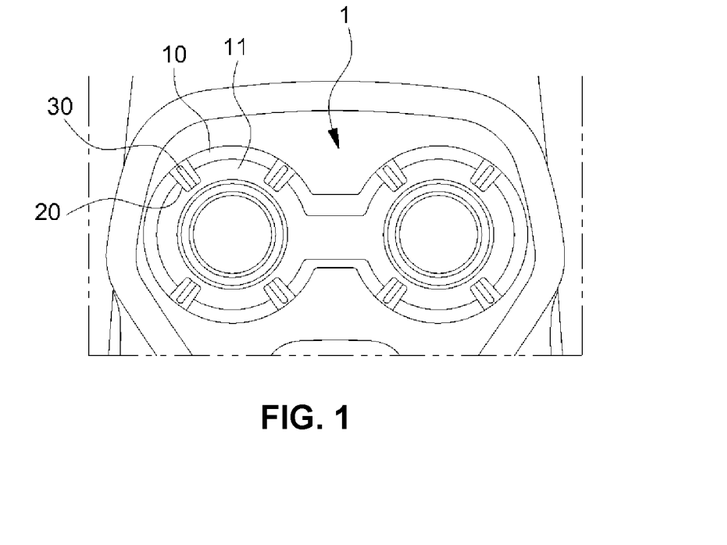
FIG. 1 is a top view illustrating a cup holder according to an embodiment of the present invention.

Hereinafter, various exemplary embodiments of the present invention will be described with reference to the drawings. FIG. 1 is a top view illustrating a cup holder 1 according to an embodiment of the present invention.

As illustrated in the drawing, the cup holder 1 according to the embodiment of the present invention includes a holder body 10, which has a holding groove 11 opened at the upper portion thereof and is provided such that a container may be inserted into and held in the holding groove 11, a guide 20, which is integrally or monolithically formed in the holder body 10, with an elastic adjustment body 30 interposed therebetween, so as to protrude inward from the holding groove 11, and tightly supports the side of the container in the state in which the guide 20 protrudes inward from the holding groove 11, and the elastic adjustment body 30 which is integrally or monolithically formed in the guide 20 and the holder body 10 so as to provide an elastic restoring force in order for the guide 20 to elastically protrude.

FIG. 1 illustrates an example in which the holder body 10 has two holding grooves 11, but the present invention is not limited thereto.

The number of such holding grooves 11 may be variously changed, and for example, the holder body 10 may have one holding groove 11. The present invention is not limited to the number of holding grooves.

In addition, the guide 20 may be provided plurally and may be circumferentially disposed at predetermined intervals in each holding groove 11 of the holder body 10.

FIG. 1 illustrates an example in which four guides 20 are circumferentially disposed at regular intervals, but the present invention is not limited to the number of guides installed in each holding groove.

Figure 2:
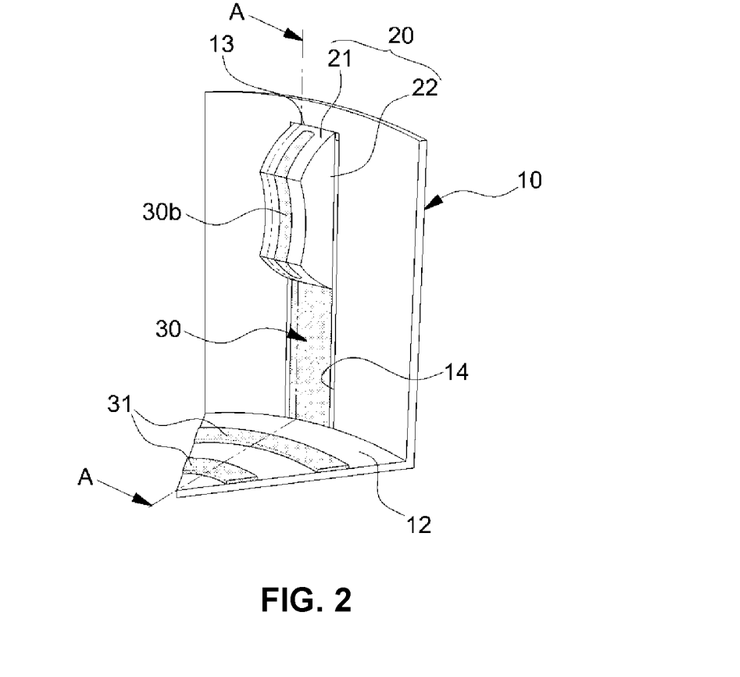
FIG. 2 is a front perspective view illustrating an installation portion of an integrated guide and elastic adjustment body in a cup holder according to a various exemplary embodiments of the present invention.
Figure 3:
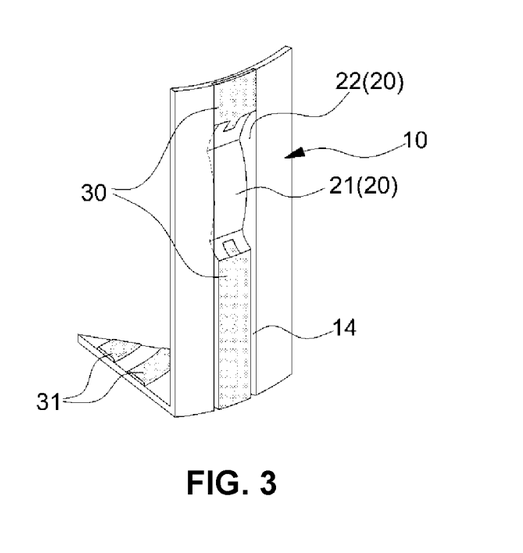
FIG. 3 is a rear perspective view illustrating the installation portion of the integrated guide and elastic adjustment body in the cup holder of the various exemplary embodiments illustrated in FIG. 2.

FIG. 2 is a front perspective view illustrating an installation portion of an integrated guide and elastic adjustment body in a cup holder according to a first embodiment of the present invention. FIG. 3 is a rear perspective view illustrating the installation portion of the integrated guide and elastic adjustment body in the cup holder of the first embodiment illustrated in FIG. 2.

Figure 4:
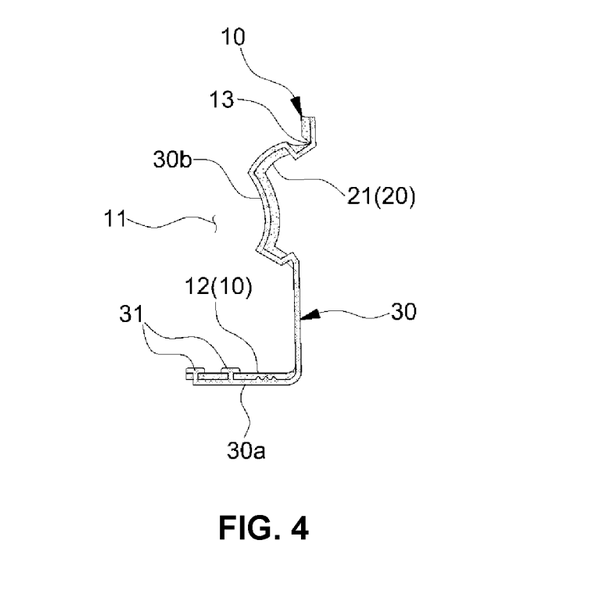
FIG. 4 is a cross-sectional view illustrating the installation portion of the integrated guide and elastic adjustment body in the cup holder of the various exemplary embodiments illustrated in FIG. 2.

In addition, FIG. 4 is a cross-sectional view illustrating the installation portion of the integrated guide and elastic adjustment body in the cup holder of the first embodiment illustrated in FIG. 2.

As illustrated in the drawings, a guide 20 has a predetermined thickness, and is formed to have a shape that protrudes inward from a holding groove 11 of a holder body 10 when an external force is not applied thereto.

In addition, the upper end of the guide 20 is integrally connected to the holder body 10, and the guide 20 is integrally fixed to an elastic adjustment body 30.

In such a structure, the boundary between the upper end of the guide 20 and the holder body 10 is a hinge portion 13 about which the guide 20 rotates, which will be described later.

The guide 20 includes a front portion 21, which is curved and has a bent shape in a predetermined portion, and a side portion 22 which is integrally or monolithically formed at each of both sides of the front portion and has a flat shape. In this case, the upper end of the front portion 21 is integrally connected to the holder body 10.

The guide 20 may be made of the same hard material, e.g. synthetic resin, as the holder body 10. In more detail, the guide 20 may be made of, for example, PP (polypropylene) resin or ABS (acrylonitrile-butadiene-styrene) resin, and may be injection-molded together with the holder body 10.

In addition, the lower end of the elastic adjustment body 30 is integrally connected to the holder body 10. In this case, the lower end of the elastic adjustment body 30 may be integrally connected to a base portion 12 which forms the bottom of the holder body 10.

The elastic adjustment body 30 has an elongated shape, and is disposed on the side of the holder body 10 in a vertically elongated manner. In this case, the upper end of the elastic adjustment body 30 is integrally connected to the holder body 10 in the state in which the elastic adjustment body 30 is overlapped with and fixed to the guide 20 so as to be elongated in the vertical direction thereof.

In addition, the holder body 10 has a vertically elongated opening portion 14 which is formed in the side thereof in which the guide 20 is installed. The elastic adjustment body 30, which is installed in a vertically elongated manner, and the guide 20, which is formed in the form in which it overmolds the upper portion of the elastic adjustment body 30, i.e. in the form in which it covers the upper portion of the elastic adjustment body 30, are located in the opening portion 14.

In the exemplary embodiment, the upper portion of the elastic adjustment body 30 is integrally fixed to the front portion 21 of the guide 20. The upper portion of the elastic adjustment body 30, which is a portion bonded and fixed to the front portion 21 of the guide 20, has a strip shape with a predetermined width. The upper end of the elastic adjustment body 30 is integrally bonded and fixed to the rear surface of the holder body 10, and the lower end of the elastic adjustment body 30 is bonded and fixed to the lower surface of the base portion 12 of the holder body 10.

In addition, the side end of the lower portion of the elastic adjustment body 30, which is located inside the opening portion 14 of the holder body 10, is disconnected from the opening portion 14 of the holder body 10. Also, the tip end of the side portion 22 of the guide 20 is disconnected from the opening portion 14 of the holder body 10.

The elastic adjustment body 30 is exposed at the front thereof along the central portion of the front portion 21 of the guide 20. The elastic adjustment body 30 is integrally bonded and fixed to the guide 20 along the central portion of the front portion 21 of the guide 20.

That is, a portion of the elastic adjustment body 30, which is indicated as a strip shape, is laminated and fixed to the central portion of the front portion 21 of the guide 20. On the contrary, the upper and lower ends of the guide 20 are integrally bonded and fixed to the elastic adjustment body 30 at the front and back of the central portion.

In other words, the portions where the elastic adjustment body 30 is bonded to the guide 20, i.e. the upper and lower ends of the strip-shaped portion 30b of the elastic adjustment body 30, are not exposed in the state in which they are laminated to the rear surface of the guide 20.

Ultimately, the elastic adjustment body 30 extends from the upper end of the guide 20 via the boundary with the holder body 10 to a portion of the holder body 10, which is above the boundary, and is bonded thereto. In the hinge portion 13 as the boundary, the guide 20 overmolds the elastic adjustment body 30, and the elastic adjustment body 30 is overlapped with the upper end of the guide 20, the hinge portion 13, and the holder body 10. Therefore, it is possible to secure the durability of the hinge portion 13.

In addition, the elastic adjustment body 30 has an exposure portion 31, which protrudes upward through the base portion 12 of the holder body 10 from a lower bonding portion 30a, fixedly bonded to the lower surface of the base portion 12 of the holder body 10, and is exposed on the bottom of the holding groove 11. The exposure portion 31 is located on the bottom of the holding groove 11, and serves to prevent the container from slipping and function as decoration in the cup holder 1.

The exposure portion 31 may have a circular ring shape when viewed from the bottom of the holding groove 11. In the embodiment, the exposure portion 31 includes two ring-shaped exposure portions which are disposed and formed in a concentric form.

The strip-shaped portion 30b of the elastic adjustment body 30, which is exposed, at the front thereof, in a vertically elongated manner along the central portion of the front portion 21 of the guide 20, functions as exterior decoration, together with the exposure portion 31. In addition, the strip-shaped portion 30b is a portion which comes into direct contact with the held container, and provides a slip prevention function, thereby serving to improve a force for supporting the container.

In the present invention, the elastic adjustment body 30 may be made of an elastic material, e.g. TPO (thermoplastic olefin) or TPE (Thermoplastic Elastomer) as thermoplastic resin having elasticity.

In addition, the elastic adjustment body 30 is made of a material having a contraction percentage equal to or more than a certain level, e.g. 1.5% or more, after the injection molding of the elastic adjustment body 30, in order to improve an initial elastic (restoring) force after the injection molding of the elastic adjustment body 30.

As a result, in accordance with the cup holder 1 according to the embodiment in which the holder body 10, the guide 20, and the elastic adjustment body 30 are integrally or monolithically formed, there is no need for the process of assembling these components, and thus it is possible to accomplish the object of the present invention.

The modulus of elasticity of the elastic adjustment body 30 may be adjusted by the modulus of elasticity of the material (linked with hardness), the thickness, the width, the forming area, and the shape of the elastic adjustment body 30. The elastic adjustment body 30 may have a dual structure in such a way to have a color and an embossment different from those of the guide 20 and the holder body 10.

In this case, the elastic adjustment body 30 may function as decoration for improving the aesthetic appearance of the cup holder 1.

Figure 5:
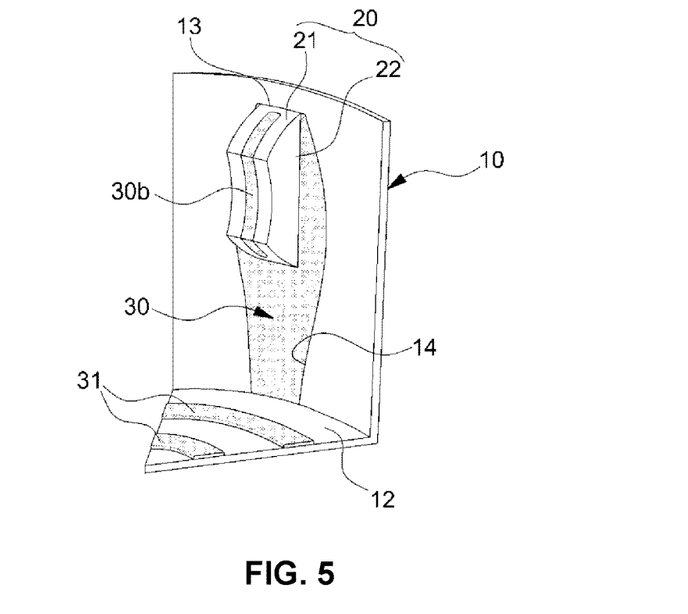
FIG. 5 is a front perspective view illustrating an installation portion of an integrated guide and elastic adjustment body in a cup holder according to a various exemplary embodiments of the present invention.
Figure 6:
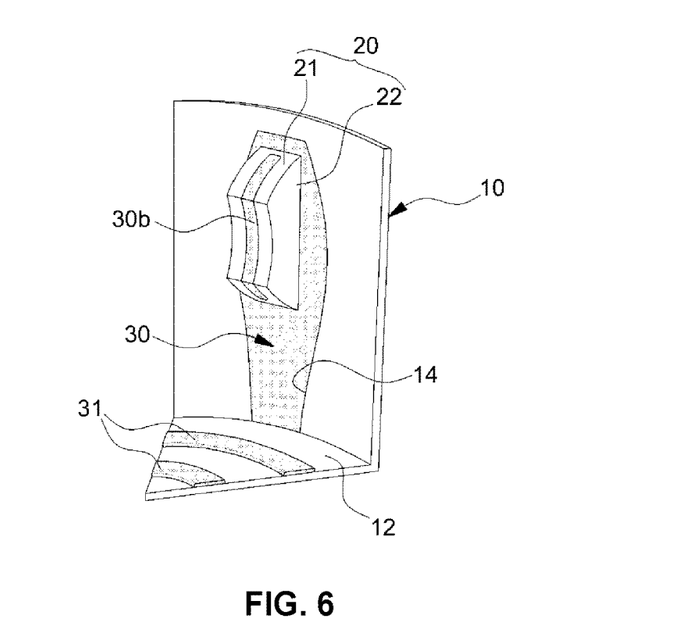
FIG. 6 is a front perspective view illustrating an installation portion of an integrated guide and elastic adjustment body in a cup holder according to a various exemplary embodiments of the present invention.

Meanwhile, FIG. 5 is a front perspective view illustrating an installation portion of an integrated guide and elastic adjustment body in a cup holder according to a second embodiment of the present invention. FIG. 6 is a front perspective view illustrating an installation portion of an integrated guide and elastic adjustment body in a cup holder according to a third embodiment of the present invention.

Unlike the first embodiment of the open-type structure in which the side end of the lower portion of the elastic adjustment body 30 is disconnected from the opening portion 14 of the holder body 10 and the tip end of the side portion 22 of the guide 20 is disconnected from the opening portion 14 of the holder body 10, the embodiments illustrated in FIGS. 5 and 6 have a closed-type structure in which all of an elastic adjustment body 30, a holder body 10, and a guide 20 are integrally interconnected and formed without disconnection, such that the elastic adjustment body 30 seals a gap between the holder body 10 and the guide 20.

The configurations of the second and third embodiments are similar to that of the first embodiment, except that the elastic adjustment body 30 is integrally or monolithically formed with the holder body 10 and the guide 20 so as to seal a gap between the holder body 10 and the guide 20. However, in the second embodiment, the side ends of the opening portion 14 of the holder body 10 may be curved so as to be convex in both left and right directions, as illustrated in FIG. 5.

That is, in the second embodiment, the opening portion 14 has a structure in which its lateral width is gradually increased and then decreased while being directed upward from the lower end thereof (or while being directed downward from the upper end thereof).

The second embodiment is similar to the first embodiment in that the upper end of the guide 20 is integrally connected to the holder body 10, and the boundary between the upper end of the guide 20 and the holder body 10 is a hinge portion 13 about which the guide 20 rotates.

On the other hand, the third embodiment differs from the first and second embodiments in that the guide 20 is not directly connected to the holder body 10, but is connected thereto through the elastic adjustment body 30.

That is, unlike the first and second embodiments in which the upper end of the guide 20 is directly connected to the holder body 10, in the third embodiment, the upper end of the guide 20 is connected to the holder body 10 through the elastic adjustment body 30. In this case, the guide 20 is entirely connected to the holder body 10 through the elastic adjustment body 30 therearound.

In the third embodiment, the upper end of the guide 20 is disconnected from the holder body 10.

Hereinafter, a method of manufacturing the cup holder according to the first embodiment of the present invention will be described with reference to FIGS. 7A-7F and FIG. 8.

The process of manufacturing the cup holder according to the first embodiment of the present invention includes a first injection molding process of integrally forming the holder body 10 and the guide 20 using a primary mold by injection molding, and a second injection molding process of inserting a primary molded product into a secondary mold and integrally forming the elastic adjustment body 30 in the holder body 10 and the guide 20 by injection molding.

Reference numeral 12a in FIG. 7 designates pores 12a formed in the base portion 12 when the holder body 10, as a primary molded product, is formed. The pores 12a are provided to form the exposure portion 31 of the elastic adjustment body 30. The exposure portion 31 is formed by pouring molten resin for forming an elastic adjustment body, which is poured into the primary mold, into a space, designated by reference numeral 107, through the pores 12a.

In addition, the space designated by reference numeral 107 is a cavity for forming the exposure portion 31 in the primary mold.

Figure 7A:
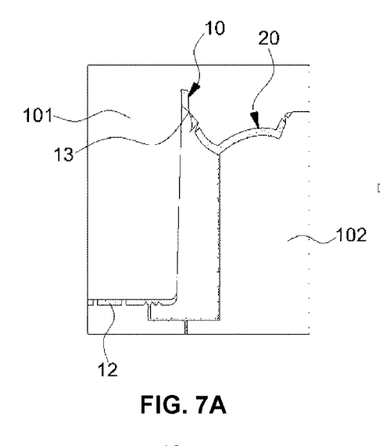
FIG. 7A, FIG. 7B, FIG. 7C, FIG. 7D, FIG. 7E, FIG. 7F, and FIG. 8 are diagrams illustrating a process of integrally forming the cup holder according to the various exemplary embodiments of the present invention.

First, as illustrated in FIG. 7(a), the molten resin is injected and poured into the cavity, which is defined by upper and lower molds 101 and 102 forming the primary mold, in the state in which the primary mold is closed, and then the mold is opened to eject the primary molded product, namely the holder body 10 and the guide 20 which are integrally or monolithically formed, from the mold.

In this case, the guide 20 is formed to be integrally connected to the holder body 10 through the hinge portion 13 which is the upper end of the guide. When the guide 20 is formed in the primary mold, the guide 20 is formed in the state in which it is rotated so as to be entirely located outside the holding groove 11 of the holder body 10.

Referring to FIG. 7(a), it can be seen that the guide 20 is connected to the holder body 10 through only the hinge portion 13, and the entirety of the guide 20 is formed so as to be substantially horizontally laid outside the holding groove 11 of the holder body 10.

Figures 7B, 7C:
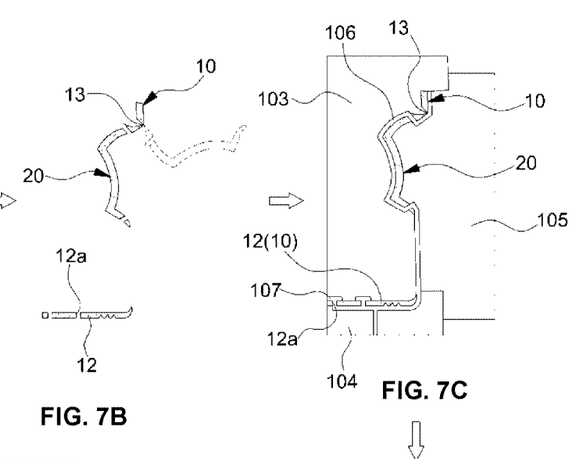

Next, after the guide 20 is located at a predetermined position by rotating about the hinge portion 13 in the primary molded product ejected from the mold, as illustrated in FIG. 7(b), the primary molded product is seated in the secondary mold, as illustrated in FIG. 7(c).

In the first injection molding process, the guide 20 is formed at a position, at which a slide mold is not required, in the primary mold, considering the condition that the slide mold may not be applied due to excessive undercut, and the ejected guide 20 is rotated about the hinge portion 13 and is then seated in the secondary mold.

Figure 7D:
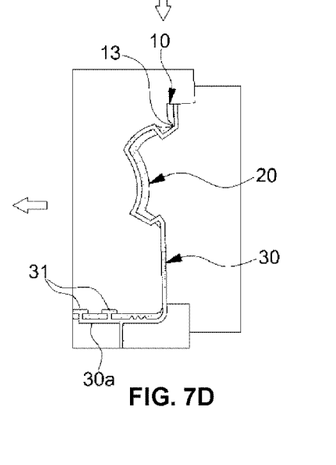

Next, as illustrated in FIG. 7(d), the elastic adjustment body 30 is integrally or monolithically formed in the holder body 10 and the guide 20 by injecting and pouring the molten resin for forming an elastic adjustment body into a cavity 106 of the secondary mold in the state in which the secondary mold is closed.

Figure 7E:
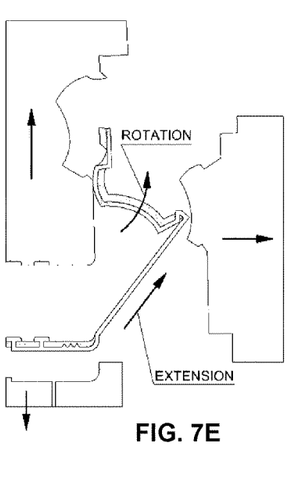

In addition, after injection molding, the secondary mold is opened to forcibly eject a secondary molded product, namely the holder body 10, the elastic adjustment body 30, and the guide 20 which are integrally or monolithically formed, from the secondary mold, as illustrated in FIG. 7(e).

When the secondary mold is opened, a first mold 103, in which the inside of the holding groove 11 of the cup holder 1 is formed, is moved upward, a second mold 104, in which the lower portion of the cup holder 1, i.e. the base portion 12 of the holder body 10 and the lower bonding portion 30a of the elastic adjustment body 30, are formed, is moved downward, and a third mold 105, in which the outside of the cup holder 1 is formed, is horizontally moved in the direction in which the mold is opened (in the right direction in the drawing), as illustrated in FIG. 7(e).

In this case, in order to resolve a problem caused due to the undercut of the guide 20 when the secondary molded product is ejected after the secondary injection molding, there is adopted a forcible ejection method of forcibly ejecting the secondary molded product from the mold while deforming the elastic adjustment body 30 when the first mold 103 is moved upward.

Figure 7F:
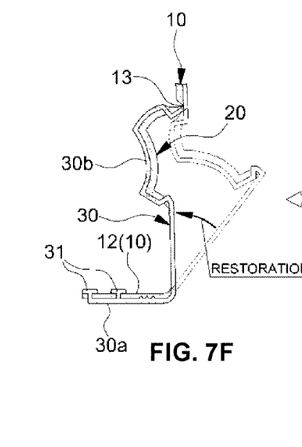

That is, as illustrated in FIG. 7(e), the guide 20 is caught by the first mold 103 moved upward after the horizontal movement of the third mold 105, thereby allowing the elastic adjustment body 30 to be extended and deformed. Then, when the secondary molded product is separated from the mold, the elastic adjustment body 30 returns to the original shape by the elasticity thereof, and thus the secondary molded product is restored to a target shape, as illustrated in FIG. 7(f).

Figure 8:
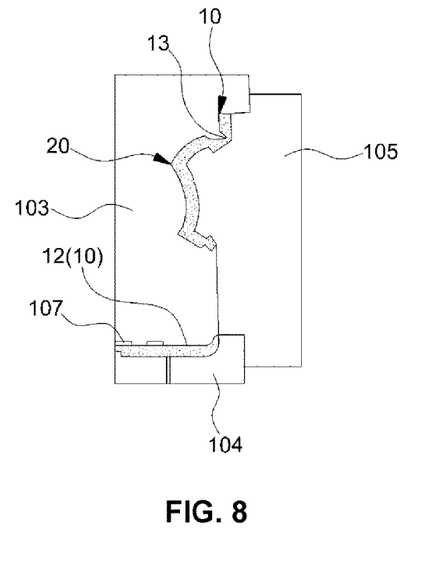

FIG. 8 is a cross-sectional view taken along line "A-A" of FIG. 2, and illustrates the primary molded product, and the state in which the primary molded product is inserted into the secondary mold. FIG. 8 illustrates the state in which, after the primary injection molding, the guide 20 is inserted into the secondary mold in a rotated state.

As illustrated in the drawing, since the elastic adjustment body 30 is integrally or monolithically formed in the front portion 21 of the guide 20 only along the central portion thereof, a cavity for forming the elastic adjustment body 30 is provided only at a corresponding position of the central portion of the front portion 21 of the guide 20 in the secondary mold, as illustrated in FIG. 7(c).

In this case, the remaining side of the guide 20 of the primary molded product is inserted into the secondary mold without a cavity for forming the elastic adjustment body 30, as illustrated in FIG. 8, and thus the inner surfaces of the mold may come into contact with both surfaces of the guide 20.

Meanwhile, the cup holder 1 according to the second embodiment of the present invention may be manufactured by the processes illustrated in FIGS. 7A-F and FIG. 8, similarly to the first embodiment.

However, the holder body 10 and the guide 20 are individually formed during the primary injection molding. In this case, the elastic adjustment body 30 is formed by inserting the holder body 10 and the guide 20, which are individually formed, into the secondary mold.

Figure 9A:
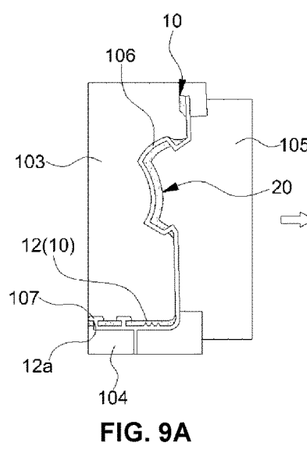
FIG. 9A, FIG. 9B, and FIG. 9C are diagrams illustrating a process of integrally forming the cup holder according to the various exemplary embodiments of the present invention.
Figure 9B:
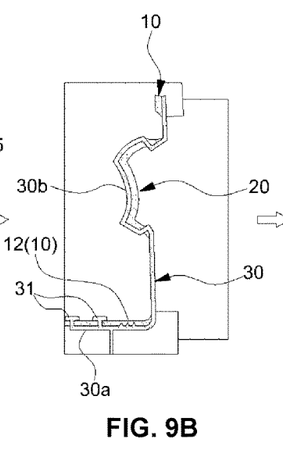
Figure 9C:
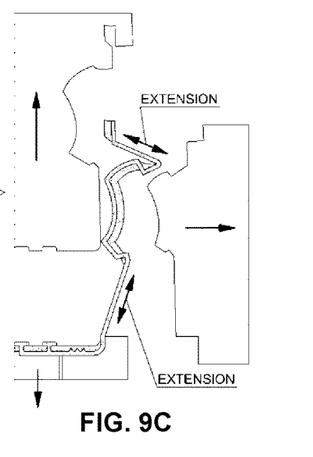

FIG. 9 is a view illustrating a second injection molding process of manufacturing the cup holder 1 according to the third embodiment of the present invention. Although not shown in the drawing, the holder body 10 and the guide 20 are individually formed during primary injection molding in order to resolve the condition that a slide mold may not be applied due to excessive undercut when the guide 20 is ejected.

Next, as illustrated in FIG. 9(a), a primary molded product, namely the holder body 10 and the guide 20 which are formed by injection molding, is inserted into the secondary mold, and then the elastic adjustment body 30 is integrally or monolithically formed in the holder body 10 and the guide 20 by injecting and pouring molten resin for forming an elastic adjustment body into a cavity in the secondary mold in the state in which the secondary mold is closed, as illustrated in FIG. 9(b).

Next, as illustrated in FIG. 9(c), the secondary mold is opened to forcibly eject a secondary molded product, namely the holder body 10, the elastic adjustment body 30, and the guide 20 which are integrally or monolithically formed, from the secondary mold.

In such a forcible ejection process, similarly to the first embodiment, when the secondary mold is opened, a first mold 103, in which the inside of the holding groove 11 of the cup holder 1 is formed, is moved upward, a second mold 104, in which the lower portion of the cup holder 1 is formed, is moved downward, and a third mold 105, in which the outside of the cup holder 1 is formed, is horizontally moved in the direction in which the mold is opened (in the right direction in the drawing), as illustrated in FIG. 9(c).

In this case, in order to resolve a problem caused due to the undercut of the guide 20 when the secondary molded product is ejected after the secondary injection molding, there is adopted a forcible ejection method of forcibly ejecting the secondary molded product from the mold while deforming the elastic adjustment body 30 when the first mold 103 is moved upward.

That is, as illustrated in FIG. 9(c), the guide 20 is caught by the first mold 103 moved upward after the horizontal movement of the third mold 105, thereby allowing the elastic adjustment body 30 to be extended and deformed. Then, when the secondary molded product is separated from the mold, the elastic adjustment body 30 returns to the original shape by the elasticity thereof, and thus the secondary molded product is restored to a target shape.

Figure 10:
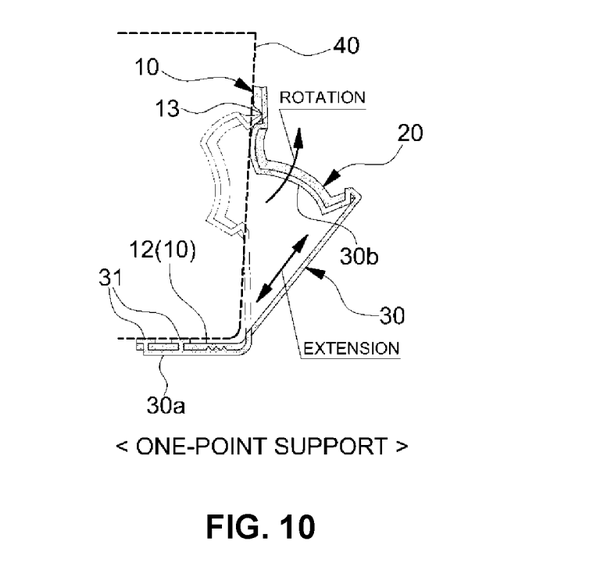
FIG. 10 is a view illustrating a state in which the guide and the elastic adjustment body are operated when a container is held in the cup holder according to the various exemplary embodiments of the present invention.

FIG. 10 is a view illustrating the state in which the guide 20 and the elastic adjustment body 30 are operated when the container is held in the cup holder 1 according to the first embodiment of the present invention. When the container is inserted into the holding groove 11 of the holder body 10 (see FIG. 1), the side of the container pushes the guide 20 while coming into contact with the guide 20, and the guide 20 rotates about the hinge portion 13 formed at the upper end thereof in a direction outward from the holding groove 11 of the holder body 10.

In this case, the lower portion of the elastic adjustment body 30 is elastically deformed while extending, and the elastic force of the elastic adjustment body 30 acts as a force that presses the guide against the container, namely is applied to the container as the contact force and support force of the guide 20.

Thus, the container may be stably held and supported by the guide 20 which tightly supports the container. In this case, the guide 20 supports the container in a one-point support manner, as illustrated in the drawing.

In addition, since the guide 20 rotates about the hinge portion 13 formed at the upper end thereof in the second embodiment, the operation thereof is performed as illustrated in FIG. 10.

Figure 11:
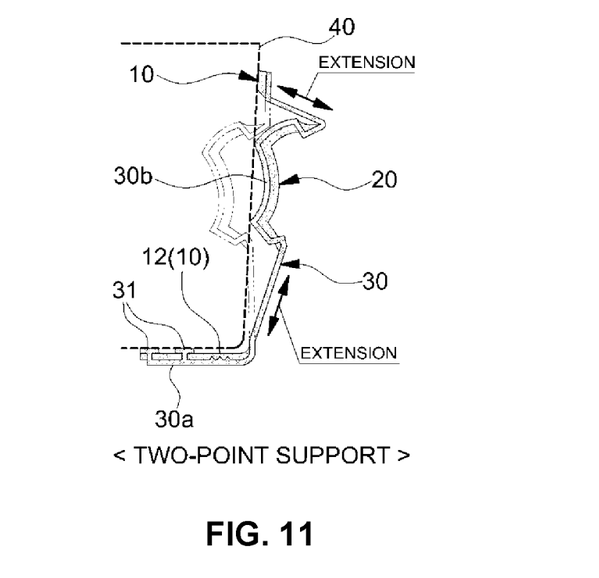
FIG. 11 is a view illustrating a state in which the guide and the elastic adjustment body are operated when a container is held in the cup holder according to the various exemplary embodiments of the present invention.

FIG. 11 is a view illustrating the state in which the guide 20 and the elastic adjustment body 30 are operated when the container is held in the cup holder 1 according to the third embodiment of the present invention. When the container is inserted into the holding groove 11 of the holder body 10, the side of the container pushes the guide 20 while coming into contact with the guide 20. In this case, the portions of the elastic adjustment body 30, which are located at upper and lower sides of the guide 20, are extended, and the guide 20 is pushed outward from the holding groove 11 of the holder body 10.

In this case, the elastic adjustment body 30 is elastically deformed while extending, and the elastic force of the elastic adjustment body 30 acts as a force that presses the guide against the container, namely is applied to the container as the contact force and support force of the guide 20.

Thus, the container may be stably held and supported by the guide 20 which tightly supports the container. In this case, the guide 20 supports the container in a two-point support manner, as illustrated in the drawing.

As is apparent from the above description, in accordance with a cup holder and a method of manufacturing the same according to the present invention, it is possible to reduce the number of parts and assembly processes by integrally forming and manufacturing a holder body, a guide, and an elastic adjustment body, and thus to reduce costs.

In addition, it is possible to resolve noise occurring in spring connection through the integrally or monolithically formed guide, and to improve non-uniform operating force. It is possible to maximize support force and emotional quality when a container is inserted into the cup holder, by adjusting the material, thickness, length, width, shape, and area of the elastic adjustment body.

In addition, it is possible to vary a modulus of elasticity depending on each guide, for example, it is possible to increase a modulus of elasticity in the direction in which the container such as a cup falls, if necessary.

In addition, the present invention can differentially utilize cup holders according to first to third embodiments, considering surrounding and service environments such as a package space around the cup holder and a need to be supported.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A cup holder comprising:
a holder body having a holding groove opened at an upper portion of the holder body, wherein a container is configured to be inserted into the holding groove;
a guide integrally or monolithically formed in the holder body with an elastic adjustment body interposed therebetween, to protrude inward from the holding groove, the guide supporting a side of the container in a state in which the guide protrudes inward from the holding groove; and
the elastic adjustment body integrally formed in the guide and the holder body to provide an elastic restoring force in order for the guide to elastically protrude,
wherein the guide comprises:
a front portion curved and having a bent shape in a predetermined portion; and
a side portion integrally formed at each of both sides of the front portion,
wherein an upper end of the front portion is integrally connected to the holder body,
wherein the front portion of the guide covers an upper portion of the elastic adjustment body in an overmolding manner,
wherein the upper portion of the elastic adjustment body is in a strip shape to form a strip-shaped upper portion with a predetermined width,
wherein the strip-shaped upper portion of the elastic adjustment body is laminated and integrally and fixedly bonded to a central portion of the front portion of the guide and a front of the strip-shaped upper portion is exposed through a slit formed along the central portion of the front portion of the guide, and
wherein upper and lower ends of the guide are laminated and integrally and fixedly bonded to the elastic adjustment body, such that the elastic adjustment body is not exposed in the upper and lower ends of the guide.

2. The cup holder of claim 1, wherein the guide is provided plurally and is integrally formed on an inner surface of the holding groove of the holder body, the guides being circumferentially disposed at predetermined intervals.

3. The cup holder of claim 1, wherein the guide has a predetermined thickness, and is formed to have a shape that protrudes inward from the holding groove of the holder body when an external force is not applied thereto.

4. The cup holder of claim 1, wherein an upper end of the guide is integrally connected to the holder body, a boundary between the upper end of the guide and the holder body is a hinge portion about which the guide rotates, and the elastic adjustment body is integrally connected between the guide and the holder body.

5. The cup holder of claim 1, wherein
the elastic adjustment body is integrally connected, at a lower end thereof, to the holder body, and has a vertically elongated shape; and
an upper end of the elastic adjustment body is integrally connected to the holder body in a state in which the elastic adjustment body is overlapped with and fixed to the guide to be elongated in a vertical direction thereof.

6. The cup holder of claim 5, wherein the holder body has a vertically elongated opening portion formed in a side thereof in which the guide is installed, and the elastic adjustment body, which is disposed in a vertically elongated manner, and the guide, which covers an upper portion of the elastic adjustment body in an overmolding manner, are located in the opening portion.

7. The cup holder of claim 6, wherein a side end of a lower portion of the elastic adjustment body and a tip end of the side portion of the guide are disconnected from or integrally connected to the opening portion.

8. The cup holder of claim 5, wherein the lower end of the elastic adjustment body is bonded and fixed to a lower surface of a base portion of the holder body, and the lower end, as a lower bonding portion of the elastic adjustment body, has an exposure portion, which protrudes upward through the base portion of the holder body and is exposed on a bottom of the holding groove.

9. The cup holder of claim 8, wherein the exposure portion is formed in a circular ring shape on a bottom of the holding groove.

10. The cup holder of claim 4, wherein the elastic adjustment body extends from the upper end of the guide via the hinge portion, as the boundary with the holder body, to a portion of the holder body, which is above the hinge portion, and is bonded thereto.

11. The cup holder of claim 1, wherein the elastic adjustment body includes thermoplastic olefin (TPO) or Thermoplastic Elastomer (TPE) as an elastic material.

12. The cup holder of claim 1, wherein the guide is entirely connected to the holder body through the elastic adjustment body therearound.

\* \* \* \* \*